US012350938B2

(12) United States Patent
Profaca et al.

(10) Patent No.: US 12,350,938 B2
(45) Date of Patent: Jul. 8, 2025

(54) COMPACT PRINTING UNIT WITH INTEGRATED AEROSOL EXTRACTION UNIT

(71) Applicant: MEMJET TECHNOLOGY LIMITED, Dublin (IE)

(72) Inventors: Mark Profaca, North Ryde (AU); James Lawrence, North Ryde (AU); Glenn Horrocks, North Ryde (AU)

(73) Assignee: Memjet Technology Limited, Dublin (IE)

( * ) Notice: Subject to any disclaimer, the term of this patent is extended or adjusted under 35 U.S.C. 154(b) by 153 days.

(21) Appl. No.: 18/385,793

(22) Filed: Oct. 31, 2023

(65) Prior Publication Data

US 2024/0181780 A1 Jun. 6, 2024

Related U.S. Application Data

(60) Provisional application No. 63/512,536, filed on Jul. 7, 2023, provisional application No. 63/385,854, filed on Dec. 2, 2022.

(51) Int. Cl.
*B41J 2/165* (2006.01)

(52) U.S. Cl.
CPC .................................. *B41J 2/1652* (2013.01)

(58) Field of Classification Search
CPC .. B41J 2/1652; B41J 2/16505; B41J 2/16535; B41J 2/16585; B41J 2/1752; B41J 25/304; B41J 25/34; B41J 2/1714
See application file for complete search history.

(56) References Cited

U.S. PATENT DOCUMENTS

2021/0260894 A1* 8/2021 Profaca .................. B41J 25/304

FOREIGN PATENT DOCUMENTS

| | | | | |
|---|---|---|---|---|
| EP | 3296114 A1 * | 3/2018 | .......... | B41J 2/16588 |
| JP | 2006123555 A * | 5/2006 | .......... | B41J 2/16526 |
| WO | WO-2011031264 A1 * | 3/2011 | .......... | B41J 2/16511 |

* cited by examiner

*Primary Examiner* — Sharon Polk
(74) *Attorney, Agent, or Firm* — Garson & Gutierrez, PC

(57) ABSTRACT

A printing unit includes: a fixed maintenance chassis having a bottom plate defining a plurality of first slots; print modules having a respective inkjet printheads extending across a media feed path; a lift mechanism for lifting and lowering the print modules relative to the media feed path; and an aerosol extraction unit mounted to an underside of the bottom plate. The aerosol extraction unit includes a plurality of aerosol extractors, which extend across the media feed path between a pair of side bars, the aerosol extractors being spaced apart along the media feed direction to define a corresponding plurality of second slots aligned with the first slots. Each print module is slidably movable through its respective first and second slots towards the media feed path into a printing position.

14 Claims, 6 Drawing Sheets

COMPACT PRINTING UNIT WITH INTEGRATED AEROSOL EXTRACTION UNIT

PRIORITY

This application claims the benefit of priority to U.S. Provisional Patent Application Ser. No. 63/385,854 filed Dec. 2, 2022, entitled "Aerosol Extractor for Inkjet Printing System", and U.S. Provisional Patent Application Ser. No. 63/512,536 filed Jul. 7, 2023, entitled "Compact Printing Unit with Integrated Aerosol Extraction Unit", the contents of each of the foregoing being incorporated herein by reference in its entirety.

FIELD OF THE DISCLOSURE

This present disclosure relates to a printing unit with integrated print modules, maintenance modules and aerosol extraction unit for a digital inkjet press. It has been developed primarily to provide a full color digital inkjet press having a minimal footprint for facile integration into an existing analog press.

BACKGROUND OF THE DISCLOSURE

Inkjet printers employing Memjet® technology are commercially available for a number of different printing formats, including desktop printers, digital inkjet presses and wideformat printers. Memjet® printers typically comprise one or more stationary inkjet printhead cartridges, which are user-replaceable. For example, a desktop label printer comprises a single user-replaceable multi-colored printhead cartridge, a high-speed label printer comprises a plurality of user-replaceable monochrome printhead cartridges aligned along a media feed direction, and a wideformat printer comprises a plurality of user-replaceable printhead cartridges in a staggered overlapping arrangement so as to span across a wideformat pagewidth.

U.S. Pat. No. 10,076,917, the contents of which are incorporated herein by reference, describes a commercial pagewide printing system comprising an N×M two-dimensional array of print modules and corresponding maintenance modules. Providing OEM customers with the flexibility to select the dimensions and number of printheads in an N×M array in a modular, cost-effective kit form enables access to a wider range of commercial digital printing markets that are traditionally served by analog (offset) printing systems.

Nevertheless, it is still desirable to simplify integration of modules into a compact 'drop-in' printing unit. Compact printing units enable them to replace analog printing stations having a similar footprint in existing web feed systems and, moreover reduce development time and costs for OEMs.

Aerosol extraction is a critical system requirement for high-speed inkjet printing systems, especially thermal inkjet systems having relatively small drop sizes (e.g. less than 5 pL). Ink mist generated during printing must be removed as efficiently as possible in order to avoid loss of print quality and potential contamination of downstream print modules. U.S. Provisional Application No. 63/385,854 filed Dec. 2, 2022 (the contents of which are incorporated herein by reference) describes a novel aerosol extractor, which makes use of an air knife to disrupt aerosol trapped in a boundary layer associated with moving media and remove the disrupted aerosol via suction.

It would be desirable to provide a compact full-color inkjet printing unit, which includes an efficient aerosol extraction unit whilst maintaining a minimal overall footprint of the printing unit. Providing a minimal footprint requires compact integration not only of mechanical components of the printing unit, but also electrical cabling and ink lines supplying power, data and ink to printheads.

SUMMARY

In one aspect, a printing unit is disclosed. In one embodiment, the printing unit includes:

- a fixed maintenance chassis having a bottom plate defining a plurality of first slots;
- a plurality of print modules, each print module having a respective printhead extending across a media feed path;
- a lift mechanism for lifting and lowering the print modules relative to the media feed path; and
- an aerosol extraction unit mounted to an underside of the bottom plate, the aerosol extraction unit comprising a plurality of aerosol extractors extending across the media feed path between a pair of side bars, the plurality of aerosol extractors being spaced apart along the media feed direction to define a corresponding plurality of second slots aligned with the first slots,
- wherein each print module is slidably movable through its respective first and second slots towards the media feed path into a printing position.

The printing unit according to one aspect advantageously enables a compact configuration for multiple print modules with efficient aerosol extraction for each print module whilst having a minimal overall footprint of the printing unit.

In another aspect, an aerosol extraction unit for an inkjet printer having one or more printheads is disclosed. In one embodiment, the aerosol extraction unit includes:

- a frame having first and second opposite side bars extending parallel with a media feed direction; and
- one or more aerosol extractors extending perpendicular to the media feed direction between the first and second side bars, each aerosol extractor including:
  - an air knife having a knife slot for directing a flow of air towards print media; and
  - a suction nozzle positioned upstream of the knife slot for directing aerosol into a suction channel, wherein:

- the first side bar comprises an air manifold in fluid communication with each knife slot; and
- the second side bar comprises a suction manifold in fluid communication with each suction nozzle.

The aerosol extraction unit according to one aspect provides a compact unit for multiple printheads, which leverages the novel aerosol extractor described in U.S. Provisional Application No. 63/385,854 filed Dec. 2, 2022 (the contents of which are incorporated herein by reference).

In yet another aspect, a printing unit is disclosed. In one embodiment, the printing unit includes:

- a fixed unit chassis having a lower cable tray mounted to a front part thereof;
- a movable printhead chassis having an upper cable tray mounted to a front face thereof, the printhead chassis supporting an upstream print module and a downstream print module relative to a media feed direction;
- a lift mechanism for lifting and lowering the printhead chassis relative to the unit chassis;

upstream and downstream cable trunkings positioned at opposite upstream and downstream ends of the unit chassis for receiving electrical cabling from the lower cable tray; and upstream and downstream conduits connected to the upstream and downstream print modules respectively, wherein the downstream cable trunking feeds electrical cabling from the lower cable tray into the upstream conduit via the upper cable tray, and the upstream cable trunking feeds electrical cabling from the lower cable tray into the downstream conduit via the upper cable tray.

The printing unit according to one aspect advantageously provides efficient and compact management of electrical cabling in a system having multiple print modules supported on a movable printhead chassis.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g., pre-coats and finishers), 3D printing fluids, biological fluids and the like.

As used herein, the term "mounted" includes both direct mounting and indirect mounting via an intervening part.

BRIEF DESCRIPTION OF THE DRAWINGS

One embodiment of the present disclosure will now be described by way of example only with reference to the accompanying drawings, in which.

DETAILED DESCRIPTION

Inkjet Printing Unit 1

Figure 6:
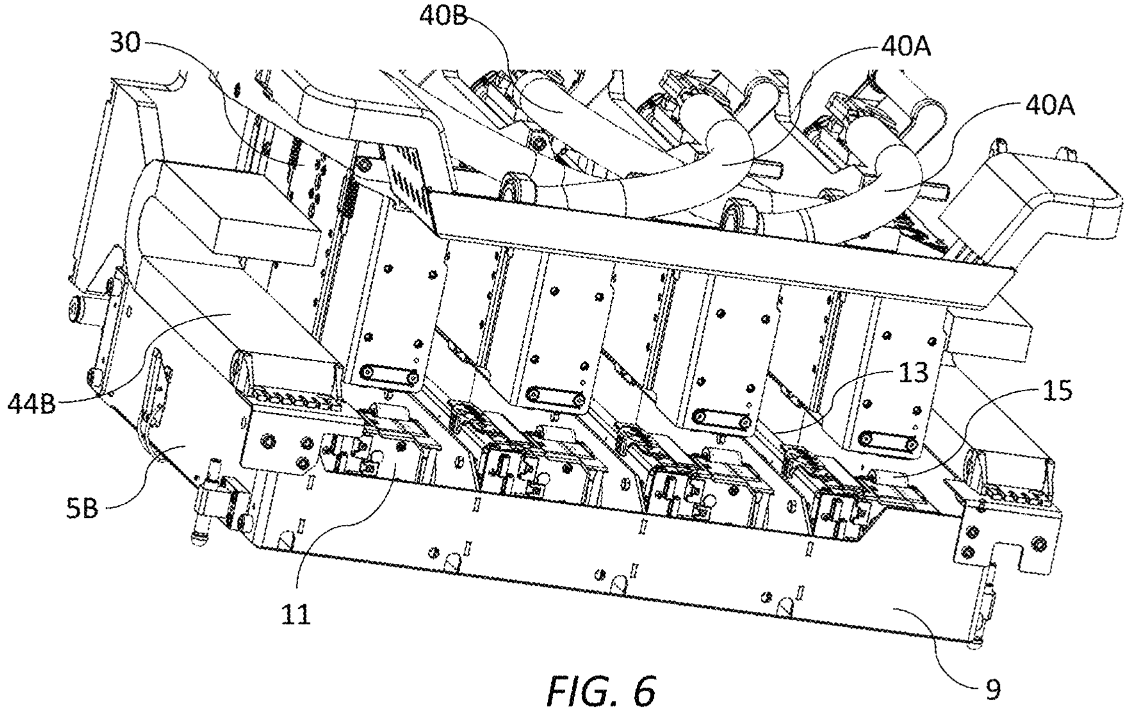
FIG. 6 is a magnified top perspective of the printing unit with the bottom cable tray removed to reveal the maintenance chassis.
Figure 7:
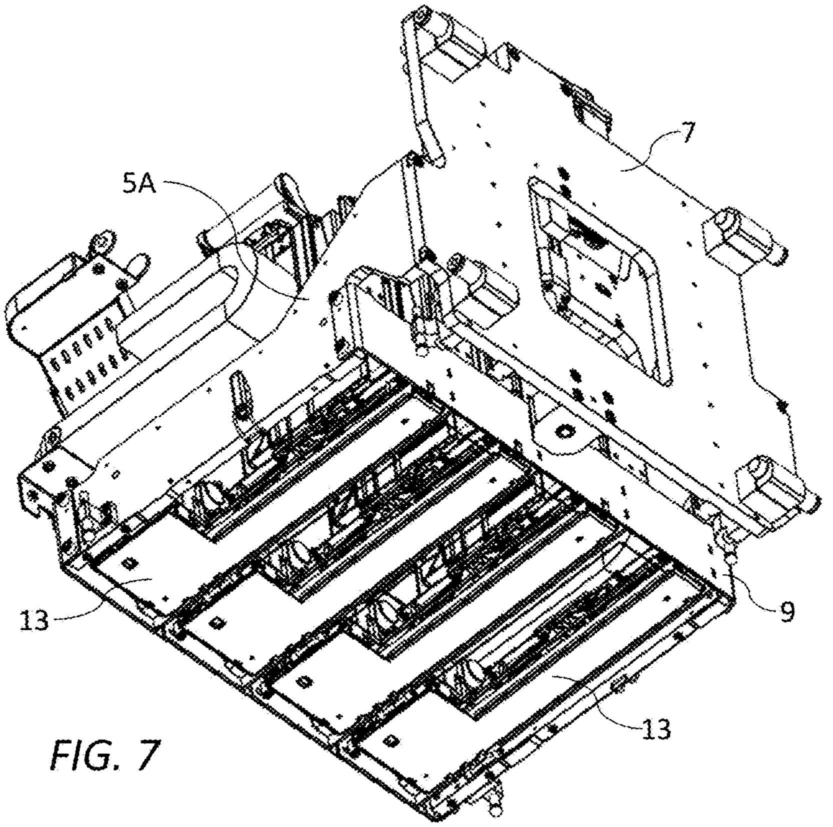
FIG. 7 is a bottom perspective of the printing unit with the extraction unit and bottom plate removed.
Figure 8:
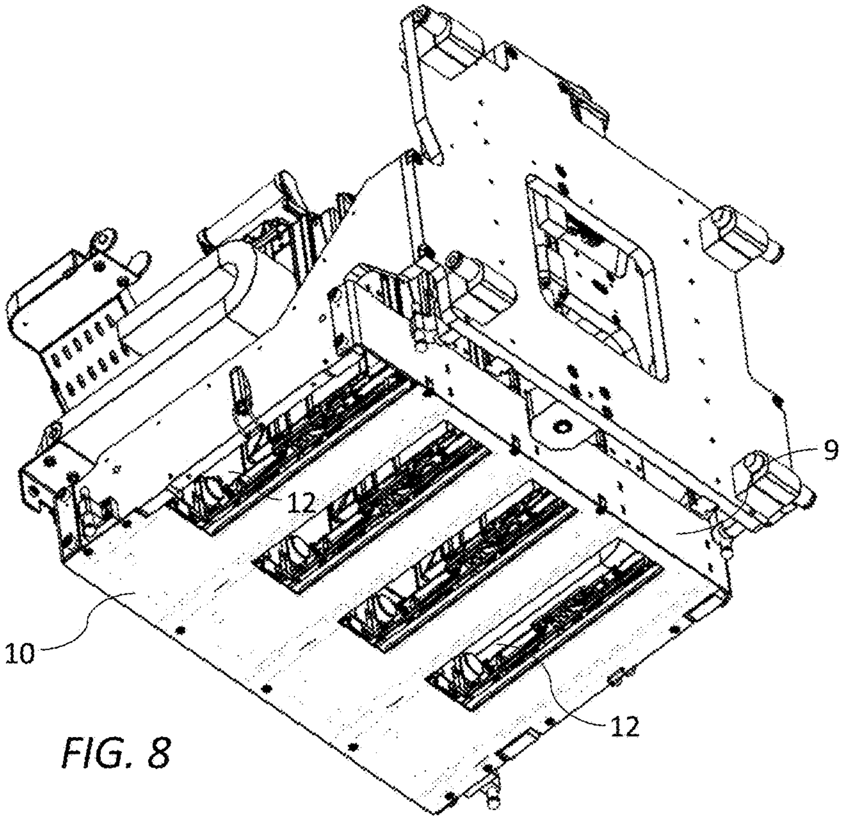
FIG. 8 is a bottom perspective of the printing unit with only the extraction unit removed.

Referring to FIGS. 1 to 4, there is shown an inkjet printing unit 1 according to one aspect of the present disclosure. The printing unit 1 comprises a unit chassis 3 having a pair of rigid upstream and downstream support arms 5A and 5B extending away from a back plate 7 perpendicular to a media feed direction indicated by arrow M. A maintenance chassis 9 is mounted between the support arms 5A and 5B so as to extend along a length of the printing unit 1. The maintenance chassis 9 supports four maintenance modules 11, typically of the type described in U.S. Pat. No. 10,076,917, the contents of which are incorporated herein by reference. Referring briefly to FIGS. 6 to 8, each maintenance module 11 has an L-shaped base frame 13 fixed to a bottom plate 10 of the maintenance chassis 9, with each maintenance module supporting a respective capper 15 and wiper 17.

Figure 1:
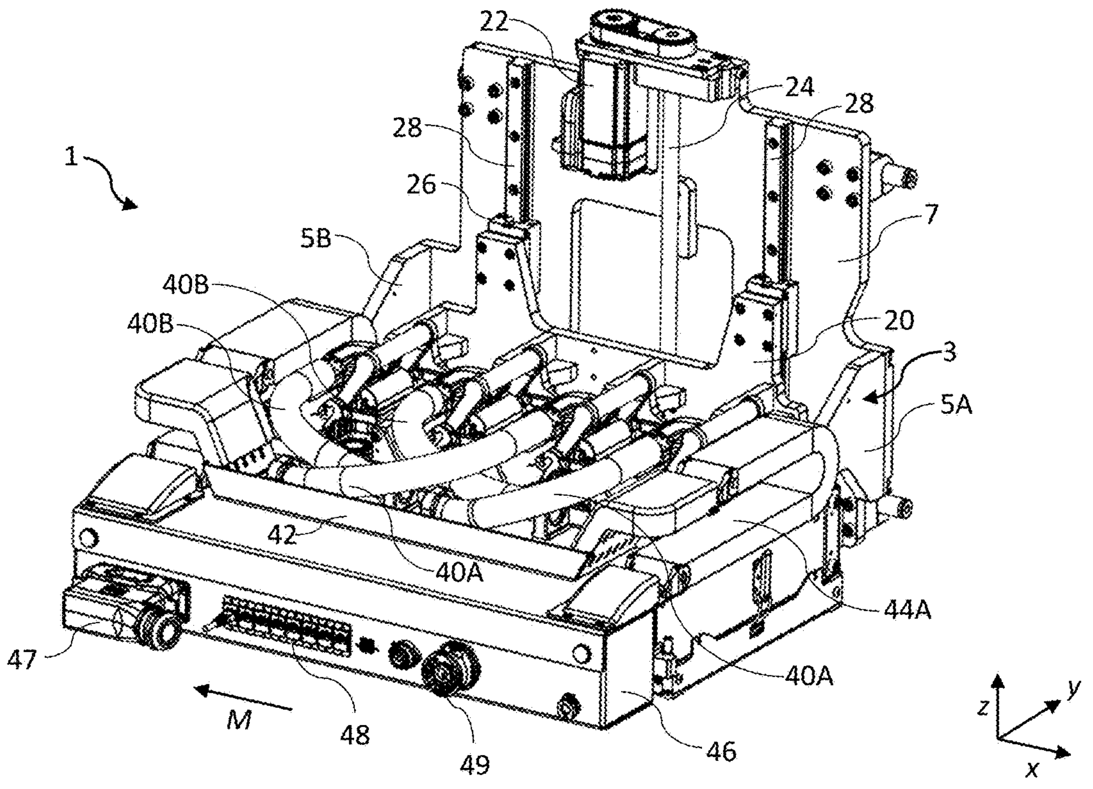
FIG. 1 is a top perspective view of a printing unit according to one embodiment in its printing position.
Figure 2:
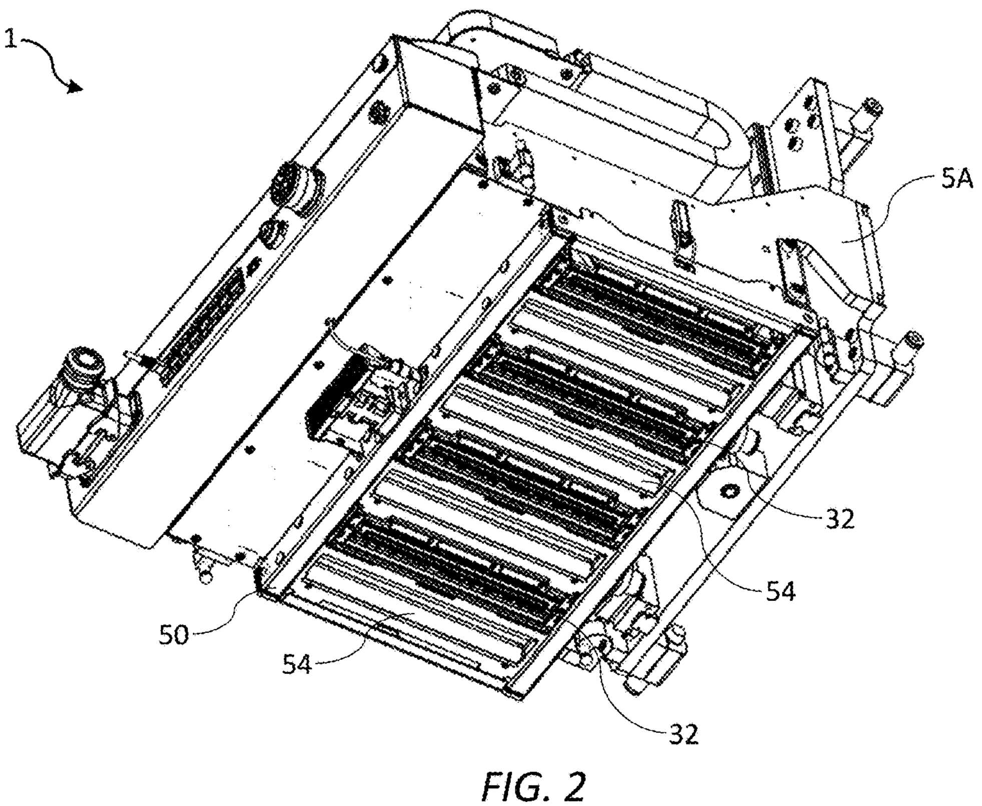
FIG. 2 is a bottom perspective of the printing unit in its printing position.

Returning to FIGS. 1 to 4, a printhead chassis 20 is liftably mounted to the back plate 7 via a lift mechanism. The lift mechanism comprises a lift motor 22 operatively connected to a lead screw mechanism 24, which reciprocally lifts and lowers the printhead chassis 20 along a nominal z-axis between a printing position (FIGS. 3 and 4) and a maintenance position (FIGS. 1 and 2). Mounting blocks 26 of the printhead chassis 20 slidably engage with a pair of parallel guide rails 28 fixed to the back plate 7 of the unit chassis 3 for accurate and repeatable positioning of the printhead chassis 20 in its printing position.

The printhead chassis 20 supports four print modules 30 (CMYK), which are mounted to the printhead chassis vis respective fixed sleeve mounts 31. Typically, each print module 30 is of the type described in U.S. Pat. No. 10,076,917 and comprises a respective monochrome pagewide inkjet printhead 32 configured to extend across a media feed path as well as a supply module for supplying ink and power/data to each printhead. The print modules 30 are slidably removable from their respective fixed sleeve mounts 31 to allow printhead removal and replacement, as required.

Each print module 30 receives power, data and ink via a respective conduit 40, which houses electrical cabling and ink lines (not shown for clarity). Each conduit 40 is detachably connected to its respective print module 30, thereby enabling convenient replacement of printheads 32 via detachment of the conduit and removal of the print module from its respective sleeve mount 31. An upstream pair of conduits 40A bend downwards towards an upper cable tray 42 mounted to a front part of the printhead chassis 30, while a downstream pair of conduits 40B bend downwards in an opposite direction towards the upper cable tray. A downstream cable trunking 44B (e.g., "energy chain" or "cable drag chain") is fixed to the downstream support arm 5B and feeds electrical cabling and/or ink lines (not shown) to the upstream print modules via respective upstream conduits 40A, while an upstream cable trunking 44A is fixed to the upstream support arm 5A and feeds electrical cabling and/or ink lines to the two downstream print modules via respective downstream conduits 40B. The upstream and downstream cable trunkings 44A and 44B receive electrical cabling and/or ink lines from a lower cable tray 46 fixed to a front part of the support arms 5A and 5B, thereby providing compact management of electrical cabling and/or ink lines, whilst allowing movement of the printhead chassis 20 along the z-axis for printhead maintenance. A front face of the fixed lower cable tray 46 has a power connector assembly 47, data connectors 48 and an ink connector assembly 49 for convenient connection of power cables, data cables and ink lines, respectively, via a user-accessible front face of the printing unit 1.

Figure 3:
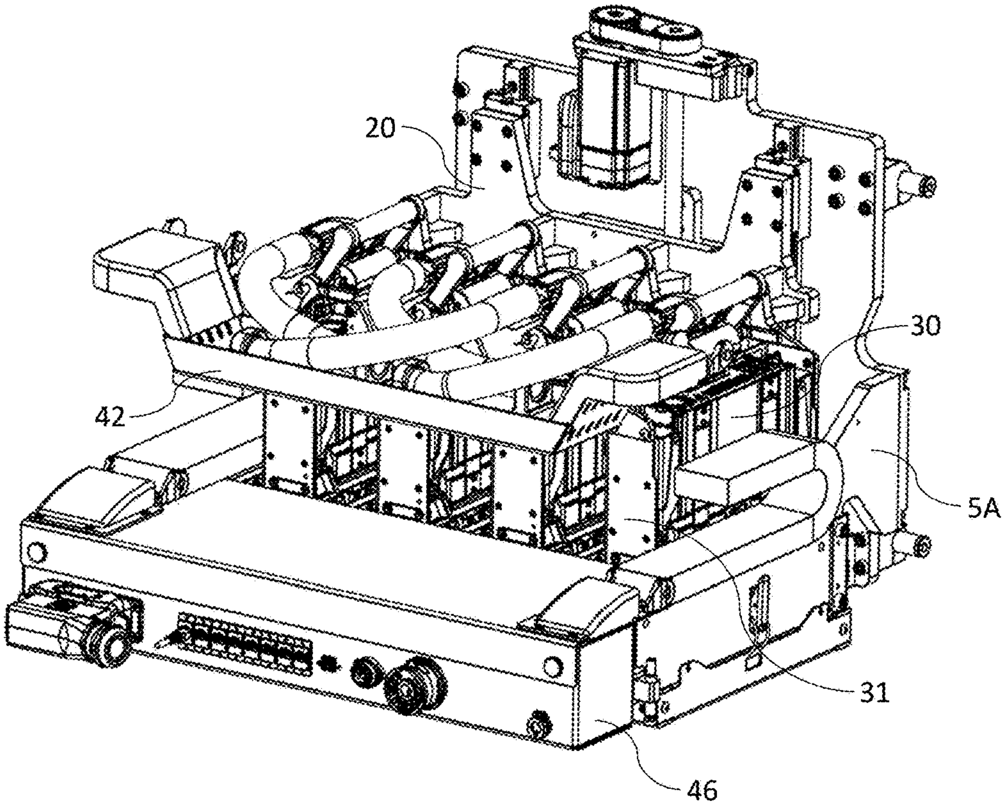
FIG. 3 is a top perspective of the printing unit in its maintenance position.
Figure 4:
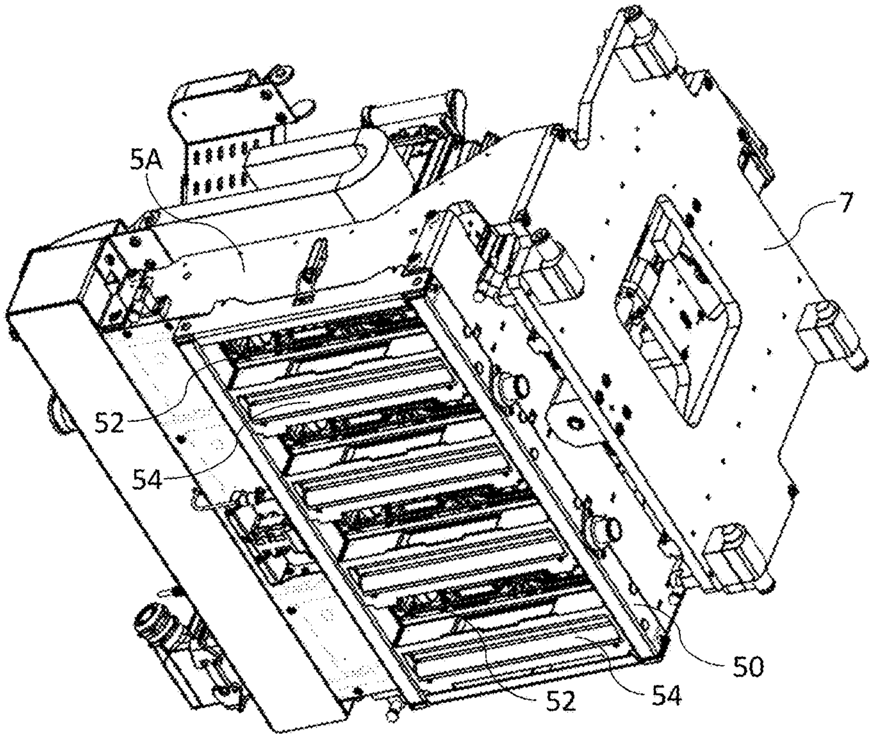
FIG. 4 is a bottom perspective of the printing unit in its maintenance position.
Figure 5:
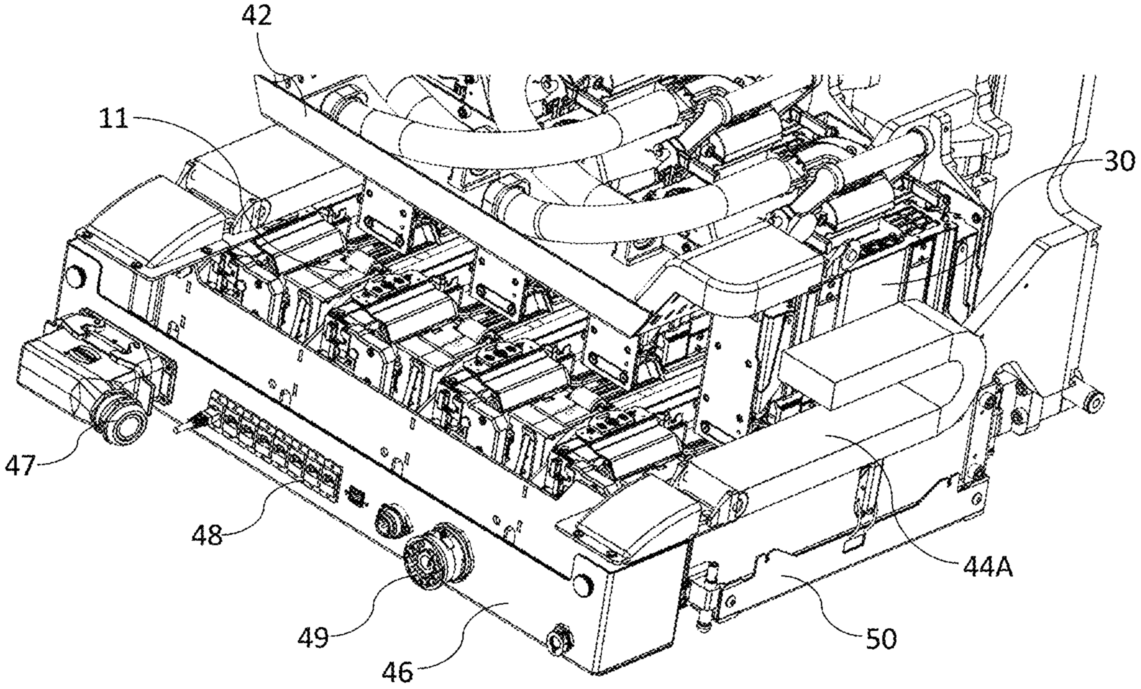
FIG. 5 is a magnified top perspective of the printing unit showing the bottom cable tray with cover removed.

As best shown in FIG. 8, the maintenance chassis 9 includes the bottom plate 10, which defines four first slots 12 corresponding to each of the four printheads 32. An aerosol extraction unit 50 is fixedly mounted to an underside of the bottom plate 10, as shown in FIGS. 2 and 4. The aerosol extraction unit 50 comprises four aerosol extractors 54 extending parallel with each of the four printheads 32 and spaced apart along the media feed direction M to define four second slots 52 aligned with the corresponding first slots 12. Each print module 30 is slidably movable, by means of the lift mechanism engaged with the printhead chassis 20, through its respective first and second slots 12 and 52 towards a media feed path into a printing position, as shown in FIGS. 1 and 2. With the print modules 30 raised above the first and second slots 12 and 52, as shown in FIGS. 3 and 4, the printing unit 1 is configured in its maintenance position for capping and/or wiping the printheads 32.

Aerosol Extraction Unit 50

Figure 9:
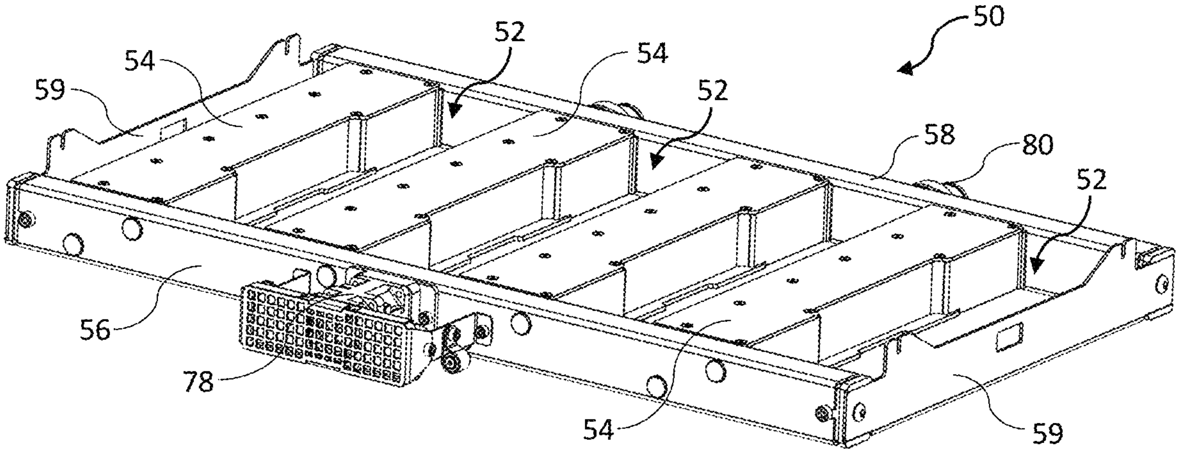
FIG. 9 is a front perspective of the aerosol extraction unit in isolation.
Figure 10:
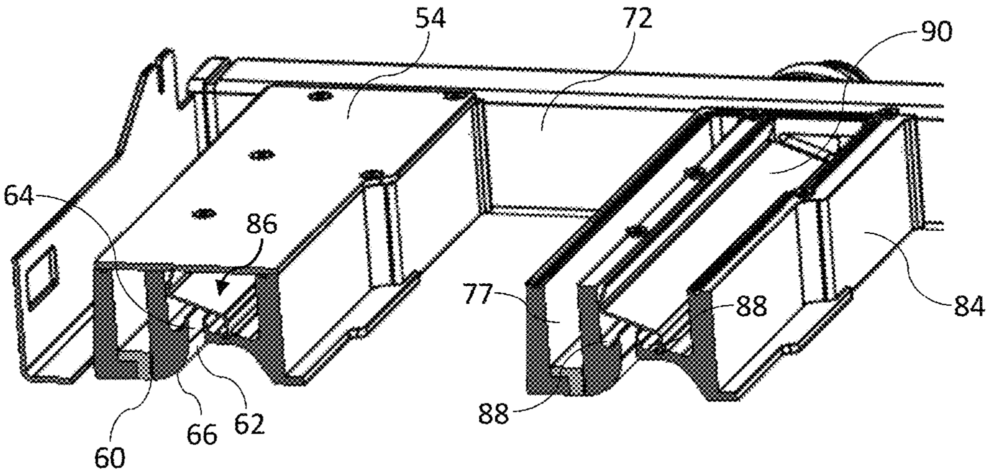
FIG. 10 is a front sectional perspective of part of the aerosol extraction unit.

The aerosol extraction unit, shown in isolation in FIG. 9, comprises a frame having first and second (front and rear) side bars 56 and 58 extending parallel with the media feed direction M and a pair of end plates 59 interconnecting the side bars. Four aerosol extractors 54 corresponding to the four print modules 30 extend perpendicular to the media feed direction between the side bars 56 and 58, each aerosol extractor being at least coextensive with its corresponding printhead 32. Each aerosol extractor 54 is generally of the type described in U.S. Provisional Application No. 63/385,854 filed Dec. 2, 2022, the contents of which are incorporated herein by reference. Accordingly, and referring now to FIG. 10, each aerosol extractor 54 includes an air knife having a knife slot 60 for directing a flow of air towards print media and a suction nozzle 62 positioned upstream of the knife slot for directing aerosol into a suction channel 64. As described in U.S. Provisional Application No. 63/385,854, the air knife serves to disrupt ink aerosol trapped in a boundary layer associated with fast-moving print media by providing a relatively high velocity airflow directed onto the media, while the suction nozzle 62 extracts the disrupted aerosol from a region upstream of the air knife using a relatively lower velocity airflow. As shown in FIG. 10, each suction nozzle 62 is positioned higher than its respective knife slot 60 relative to the media feed path and a convex guide surface 66 extends between an upstream side of each knife slot and a downstream side of each suction nozzle. The disrupted aerosol tends to follow the guide surface 66 into the suction nozzle 62 by virtue of the Coanda effect.

Figure 11:
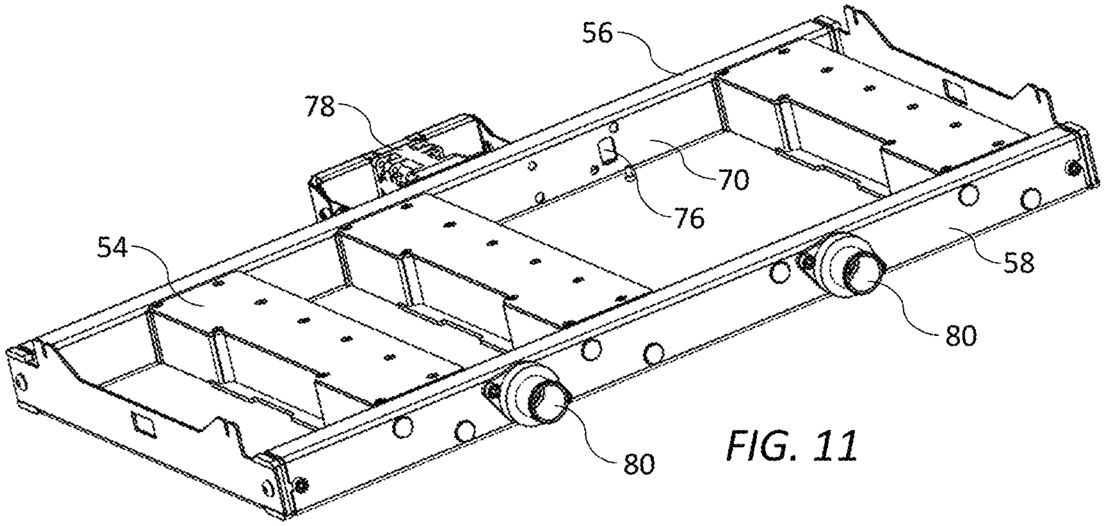
FIG. 11 is a rear perspective of the aerosol extraction unit with one of the aerosol extractors removed.
Figure 12:
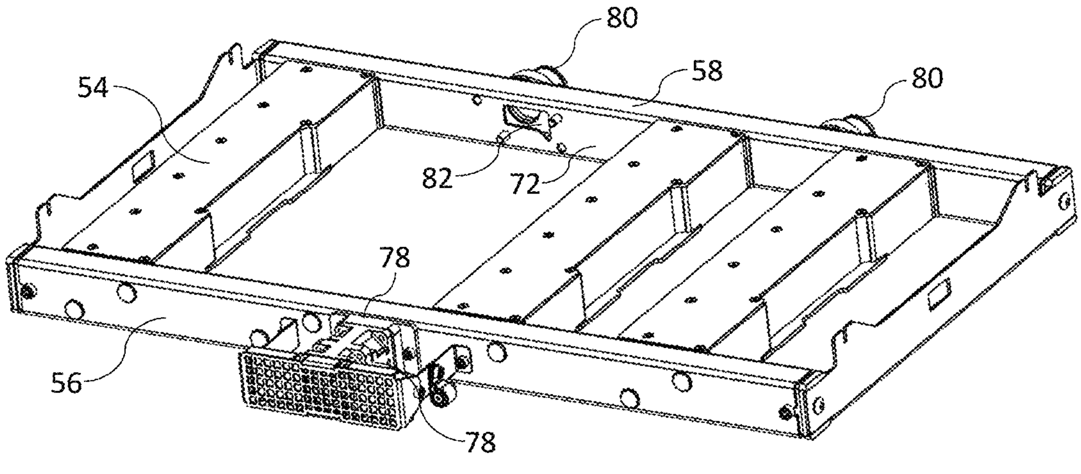
FIG. 12 is front perspective of the aerosol extraction unit with one of the aerosol extractors removed.

For compact integration of multiple aerosol extractors, and referring now to FIGS. 11 and 12, the first side bar 56 comprises an air manifold 70 in fluid communication with each one of the knife slots 60, while the second side bar 58 comprises a suction manifold 72 in fluid communication with each one of the suction nozzles 62. The air manifold 70 has an air inlet port 74 for connection to a pressurized air source and four air outlets 76 connected to four corresponding air channels 77 of the aerosol extractors 54. The air inlet port 74 incorporates a blower fan and filter assembly 78 for delivering clean, pressurized air into the air manifold 70. The suction manifold 72 comprises a pair of suction ports 80 for connection to a vacuum source (not shown) and suction openings 82, which provide suction to respective suction channels 64 of the four aerosol extractors 54. The suction ports 80 may be connected to the vacuum source via suitable tubing (not shown) extending through an opening in the back plate 7 of the printing unit 1.

As shown in FIG. 10, each aerosol extractor 54 comprises an extractor housing 84 having a suction chamber 86 connected to one of the suction openings 82 of the suction manifold 72. The suction channel 64 is connected to the suction chamber 86 and thence to the suction manifold 72 via the suction openings 82. Gutters 88 extend along a length of each suction chamber 86 for collecting aerosol deposited on internal surfaces thereof. In addition, an elongate baffle plate 90 extends along a length of the suction chamber 86 in order to provide a relatively even suction force along its length. In use, the aerosol extraction unit 50 provides compact and efficient aerosol extraction for each printhead 32, whilst allowing the printheads to extend into the printing position and retract into the maintenance position.

From the foregoing, it will be appreciated that the printing unit 1 provides a highly compact design with close positioning of printheads along the media direction and a minimal footprint suitable for incorporation into existing web feed systems.

It will, of course, be appreciated that the present disclosure has been described by way of example only and that modifications of detail may be made within the scope of the present disclosure, which is defined in the accompanying claims.

The invention claimed is:

1. A printing unit comprising:

a fixed maintenance chassis having a bottom plate defining a plurality of first slots;

a plurality of print modules, each print module having a respective inkjet printhead extending across a media feed path;

a lift mechanism for lifting and lowering the print modules relative to the media feed path; and an aerosol extraction unit mounted to an underside of the bottom plate, the aerosol extraction unit comprising a plurality of aerosol extractors extending across the media feed path between a pair of side bars, the plurality of aerosol extractors being spaced apart along the media feed direction to define a corresponding plurality of second slots aligned with the first slots, wherein each print module is slidably movable through its respective first and second slots towards the media feed path into a printing position.

2. The printing unit of claim 1, wherein each aerosol extractor is positioned downstream of a respective printhead relative to a media feed direction.

3. The printing unit of claim 2, wherein each aerosol extractor comprises:

an air knife having a knife slot for directing a flow of air towards print media; and a suction nozzle positioned upstream of the knife slot for directing aerosol into a suction channel.

4. The printing unit of claim 3, wherein the aerosol extraction unit comprises a frame having first and second opposite side bars extending parallel with the media feed direction, each aerosol extractor extending perpendicular to the media feed direction between the first and second side bars.

5. The printing unit of claim 4, wherein the first side bar comprises an air manifold in fluid communication with each knife slot.

6. The printing unit of claim 5, wherein the air manifold comprises an air inlet for connection to a pressurized air source and a plurality of air outlets, each one of the air outlets connected to a respective air channel of one of the aerosol extractors.

7. The printing unit of claim 4, wherein the second side bar comprises a suction manifold in fluid communication with each suction nozzle.

8. The printing unit of claim 4, wherein the suction manifold comprises a suction port for connection to a vacuum source and a plurality of suction openings, each one of the suction openings connected to a respective suction channel of one of the aerosol extractors.

9. The printing unit of claim 1, wherein the maintenance chassis comprises a plurality of maintenance modules for maintaining respective printheads.

10. The printing unit of claim 9, wherein each maintenance module comprises a respective capper positioned downstream of a respective printhead, the capper being movable towards its respective printhead in a direction opposite a media feed direction.

11. The printing unit of claim 10, wherein each capper is aligned with a respective aerosol extractor in a direction parallel with a direction of droplet ejection.

12. The printing unit of claim 1, wherein, the printing position, each printhead is positioned below a height of each aerosol extractor relative to the media feed path.

13. The printing unit of claim 12, wherein the print modules are all mounted on a respective printhead chassis, and wherein the lift mechanism is configured for slidably moving the printhead chassis relative to the maintenance chassis.

14. The printing unit of claim 13, wherein, in a maintenance position, the printheads are lifted through respective first and second slots for printhead maintenance.

* * * * *